June 3, 1941.  A. G. BUGLER  2,243,837
METHOD OF AND APPARATUS FOR WINDING ELECTRICAL COILS
Filed Sept. 7, 1939
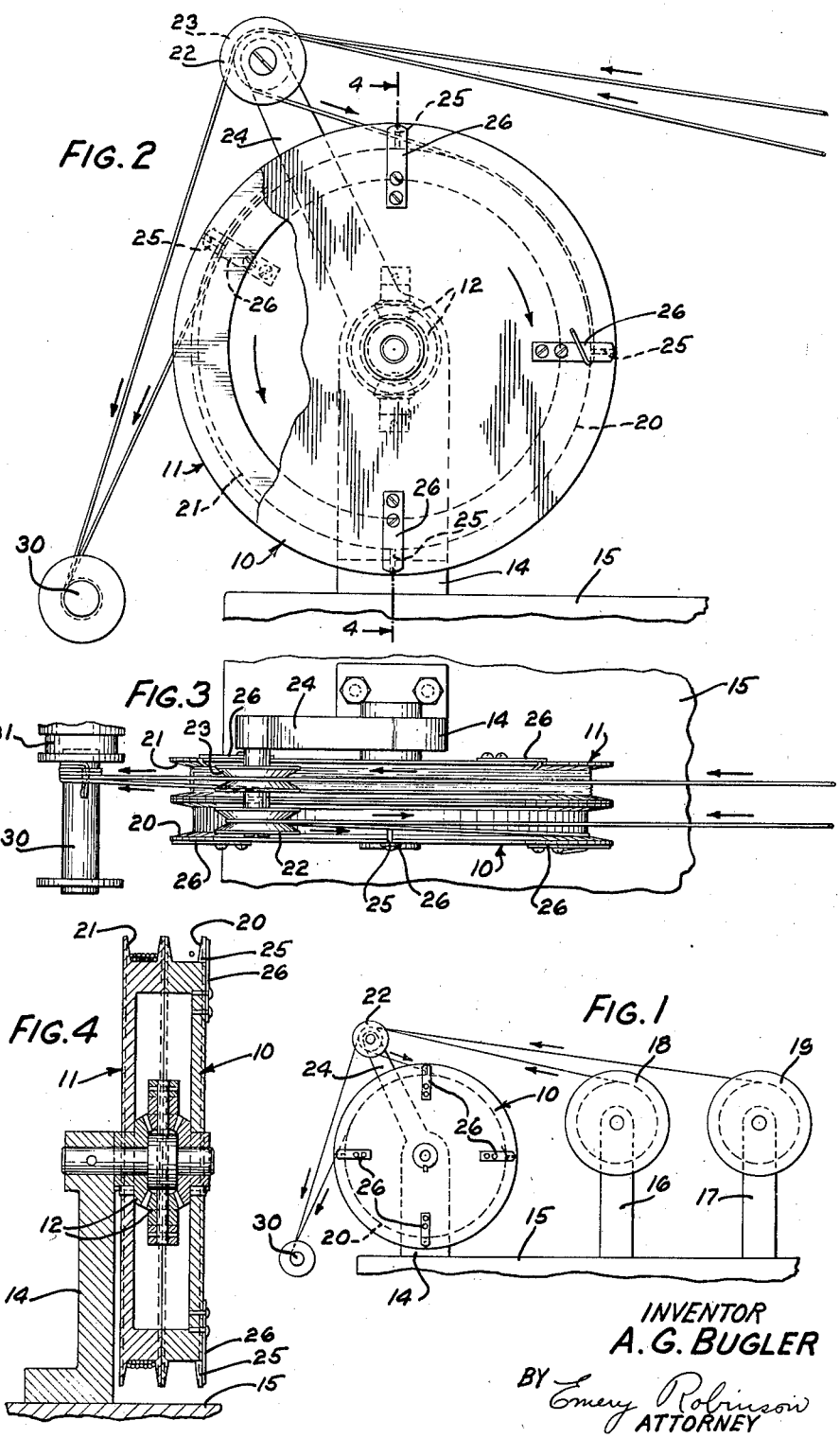
INVENTOR
A. G. BUGLER
BY Emery Robinson
ATTORNEY Patented June 3, 1941

2,243,837

UNITED STATES PATENT OFFICE 2,243,837

METHOD OF AND APPARATUS FOR WINDING ELECTRICAL COILS

Arthur G. Bugler, Hinsdale, Ill., assignor to Western Electric Company, Incorporated, New York, N. Y., a corporation of New York Application September 7, 1939, Serial No. 293,691

6 Claims. (Cl. 242—9)

This invention relates to a method of and apparatus for winding electrical coils, and more particularly to a method of and apparatus for winding non-inductive electrical coils.

Objects of the invention are to provide a practical and efficient method of and apparatus for winding non-inductive coils.

In accordance with the above objects, one embodiment of the invention contemplates the provision of a method of and apparatus for winding non-inductive coils, in which two oppositely rotating shuttles are associated with separate supply spools and are arranged so that while simultaneously feeding out wire from one of the supply spools and its associated shuttle to wind a non-inductive coil having the required number of doubled turns, a sufficient amount of wire is transferred from the other supply spool to its associated shuttle to provide for one-half the winding for another coil.

A more complete understanding of the invention may be had from the following detailed description when read in conjunction with the accompanying drawing, in which Fig. 1 is a side elevational view of an apparatus embodying the invention and by means of which the method of the invention may be practiced;

Fig. 2 is an enlarged side elevational view of a portion of the structure shown in Fig. 1;

Fig. 3 is a plan view of the structure shown in Fig. 2, and

Fig. 4 is a vertical sectional view taken on line 4—4 of Fig. 2.

As shown in the drawing, the apparatus comprises two shuttles 10 and 11 mounted side by side and interconnected by a train of gears 12, through which rotation of either one of the shuttles in one direction causes rotation of the other shuttle in the opposite direction. The two shuttles are supported by a bracket 14 attached to a suitable work bench or support 15, only a portion of which is shown in the drawing. Also attached to the support 15 are a pair of standards 16 and 17 (Fig. 1), upon which wire supply spools 18 and 19, respectively, are rotatably mounted in alignment with the shuttles 10 and 11, respectively.

The shuttle 10 has a circumferential wire receiving and storing groove 20 and shuttle 11 has a similar groove 21. Wire guiding sheaves 22 and 23 are mounted on an extension arm 24 of bracket 14 in line with the wire storage grooves of shuttles 10 and 11, respectively.

Each of the shuttles has a plurality of circumferentially spaced wire receiving slots 25, 25 in its outer peripheral flange and wire holding spring clips 26, 26 are attached to the outer surfaces of the shuttles, one adjacent each slot.

When practicing the method of the invention with the use of the above described apparatus, the end of the wire from one of the wire supply spools, for example, spool 19, is attached to shuttle 11 by inserting the wire in one of the slots 25 and then underneath the adjacent spring clip 26. The shuttle 11 is then manually rotated in a clockwise direction (Fig. 2) until a sufficient amount of wire has been wound on the shuttle to provide one-half of the winding for the first coil to be wound. The end of the wire from the other supply spool 18 is then attached to the other shuttle 10, after which the first wire is manually grasped at a point intermediate the shuttle 11 and its supply spool 19, is doubled at that point, and the doubled end is attached to a spool or core 30 to start the winding of the first coil. The core 30 is rotated by a rotary chuck 31 of a suitable winding machine (not shown) whereby the winding of the first coil proceeds until the required number of doubled turns have been wound to produce an electrical coil having the desired electrical characteristics. The wire previously stored on shuttle 11 is thus withdrawn therefrom and wound into the first coil together with an equal amount of wire drawn from the supply spool 19. Withdrawal of the wire from shuttle 11 causes rotation of this shuttle in a counter-clockwise direction, and through the train of gears 12, the shuttle 10 is thus rotated in a clockwise direction, whereby a sufficient amount of wire for one-half of the winding for the next coil is withdrawn from supply spool 18 and wound on shuttle 10.

Upon completion of the winding of the first coil, it is removed from the winding chuck and severed from the continuous wire coming from supply spool 19. The new end of this continuous wire is then attached to shuttle 11 in the manner explained above. The other continuous wire is then manually grasped at a point intermediate the shuttle 10 and supply spool 18, is doubled at that point, and the doubled end is attached to a new core previously inserted in the chuck 31. The winding of the second coil may now proceed as above, except that the wire for this coil is drawn from shuttle 10 and supply spool 18, and simultaneously therewith, a sufficient amount of wire for one-half of the winding for the next coil is drawn from supply spool 19 and wound on shuttle 11. Additional coils may be wound in a similar manner with the two shuttles serving, alternately, first to store sufficient wire for one-half of a coil winding and then to pay out the stored wire in the winding of the next coil. The winding of non-inductive electrical coils having the required number of doubled turns may thus be carried on expeditiously, and since each coil winding so produced comprises a single continuous length of wire, the inner ends of the series of parallel turns are already interconnected, thus saving the time and effort heretofore expended in connecting the inner ends of two separate wires.

It is to be understood that the invention is not limited to the specific embodiments thereof herein illustrated and described, but is capable of other applications within the scope of the appended claims.

What is claimed is:

1. The method of winding electrical coils, which comprises the steps of transferring a predetermined length of wire from a supply thereof to a storage member, and then winding a coil having a plurality of doubled turns by simultaneously withdrawing wire from the supply and the storage member.

2. The method of winding electrical coils, which comprises the steps of transferring an end portion of a continuous length of wire from a supply thereof to a storage member, doubling the wire at a point intermediate the storage member and said supply, and then winding a coil by winding a plurality of doubled turns of wire starting with the doubled end.

3. The method of winding electrical coils, which comprises the steps of winding an end portion of a continuous length of wire upon a member, doubling the wire at a point between said wound end portion and the remaining wire, and then winding a coil by winding a plurality of doubled turns of wire starting with the doubled end.

4. The method of winding electrical coils, which comprises the steps of winding an end portion of a continuous length of wire upon a shuttle, doubling the wire at a point between said wound wire and the remaining wire, winding a coil by winding a plurality of doubled turns of wire starting with the doubled end, simultaneously winding an end portion of another continuous length of wire upon a second shuttle for the subsequent winding of another electrical coil, and winding a second coil by winding a plurality of doubled turns of wire drawn from said second shuttle and said second continuous length of wire.

5. In an apparatus for winding electrical coils, the combination with a wire winding means of means for supplying wire thereto, comprising a pair of wire supply spools, each containing a continuous length of wire, a pair of rotary shuttles, one for each supply spool, means on each of the shuttles for detachably securing thereto an end of the continuous wire from its associated supply spool, and a train of gears interconnecting said shuttles, whereby rotation of one of the shuttles in one direction causes rotation of the other shuttle in the opposite direction.

6. In an apparatus for winding electrical coils the combination with a wire winding means of means for supplying wire thereto, comprising a pair of wire supply spools, each containing a continuous length of wire, a pair of rotary shuttles, one for each supply spool, said shuttles being arranged to receive wire drawn from the respective supply spools for transfer to said winding means, and means interconnecting the shuttles whereby rotation of one of the shuttles in one direction causes rotation of the other shuttle in the opposite direction.

ARTHUR G. BUGLER.